United States Patent [19]
Sultan et al.

[11] Patent Number: 5,195,162
[45] Date of Patent: Mar. 16, 1993

[54] PLANAR POLYMER LIGHT GUIDE METHODS AND APPARATUS

[75] Inventors: Michel F. Sultan, Troy; Mark K. Krage, Royal Oak, both of Mich.

[73] Assignee: General Motors Corporation, Detroit, Mich.

[21] Appl. No.: 232,077

[22] Filed: Aug. 15, 1988

Related U.S. Application Data

[63] Continuation-in-part of Ser. No. 133,509, Dec. 16, 1987, abandoned.

[51] Int. Cl.⁵ .................................................. G02B 6/10
[52] U.S. Cl. ..................................... 385/130; 385/12; 385/24
[58] Field of Search ....................... 350/96.12; 385/130

[56] References Cited

U.S. PATENT DOCUMENTS

| | | | |
|---|---|---|---|
| 3,839,067 | 10/1974 | Sosnowski et al. | 350/96.12 |
| 4,461,535 | 7/1984 | Marcatili | 350/96.12 |
| 4,472,020 | 9/1984 | Evanchuk | 350/96.12 |
| 4,529,789 | 7/1985 | Kroupa | 350/96.12 |
| 4,530,565 | 7/1985 | Markle | 350/96.12 |
| 4,535,141 | 8/1985 | Kroupa | 350/96.12 |
| 4,674,827 | 6/1987 | Izutsu et al. | 350/96.12 |

Primary Examiner—John D. Lee
Assistant Examiner—Robert E. Wise
Attorney, Agent, or Firm—Tim G. Jaeger

[57] ABSTRACT

The invention introduces the concept of very low cost, fully integrated, large scale planar polymer light guide networks. These networks are intended primarily for automotive applications, including data communication, multiplex, sensor, switch and display networks. However, the concept is also applicable in other areas where the length of the network does not exceed a few meters. The basic idea is to 'cut' a thin sheet of clear plastic (polymethylmetacrylate polycarbonate, or polystyrene) into a whole network consisting of optical links, couplers, sensors, etc. . . . In addition to being low cost, planar polymer light guide networks extend the one dimensional geometry of fiber optics into two dimensions, adding tremendous design capability and versatility.

38 Claims, 14 Drawing Sheets

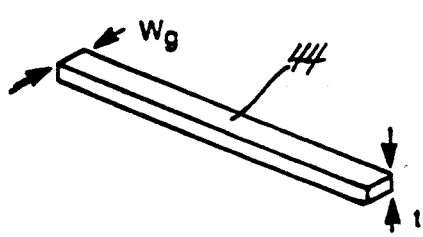
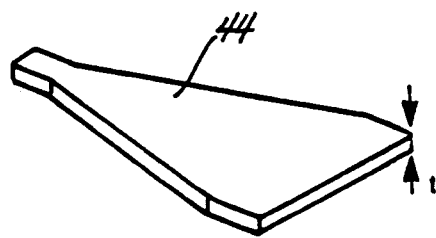
Fig. 7a     Fig. 7b
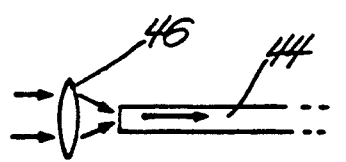
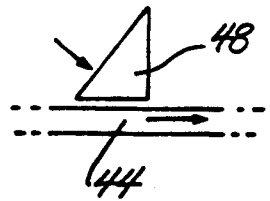
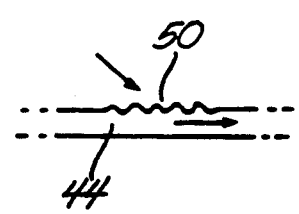
Fig. 8a     Fig. 8b     Fig. 8c

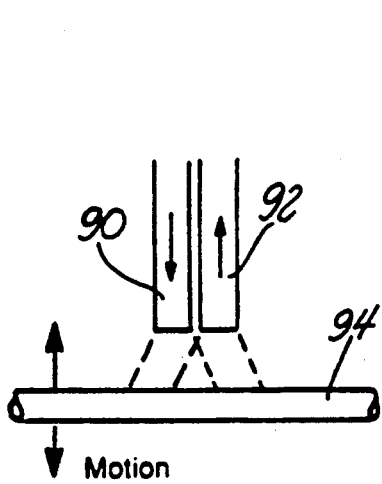
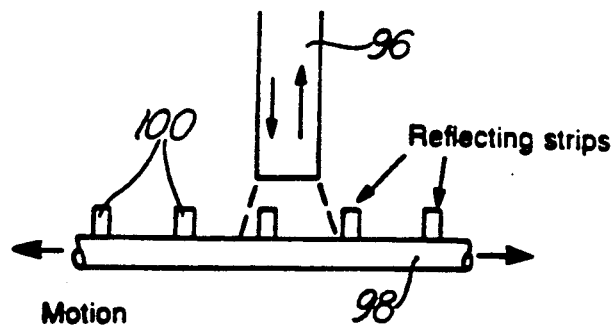
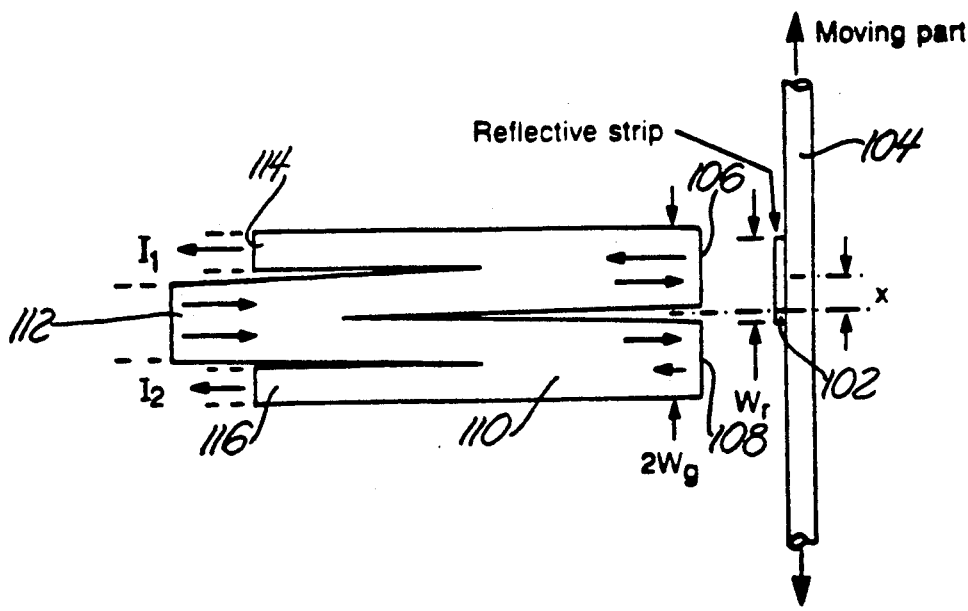
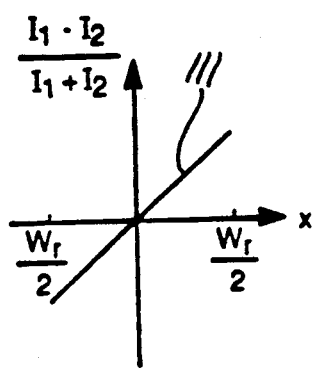
Fig. 17a
Fig. 17b
Fig. 17c
Fig. 17d

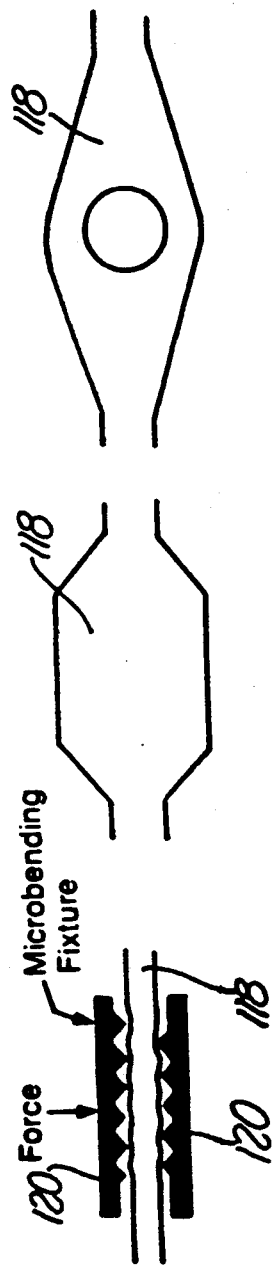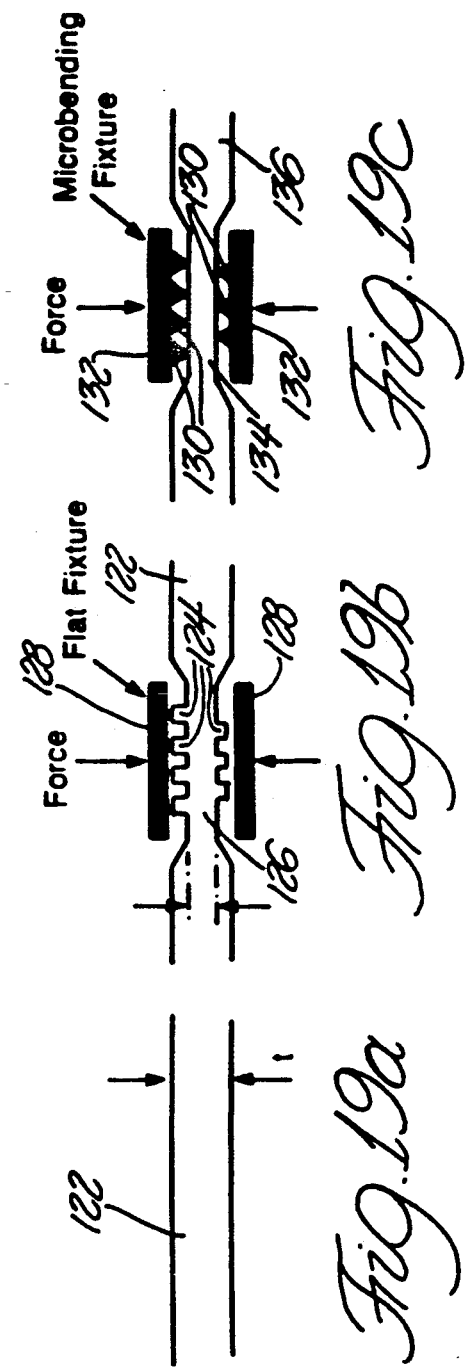

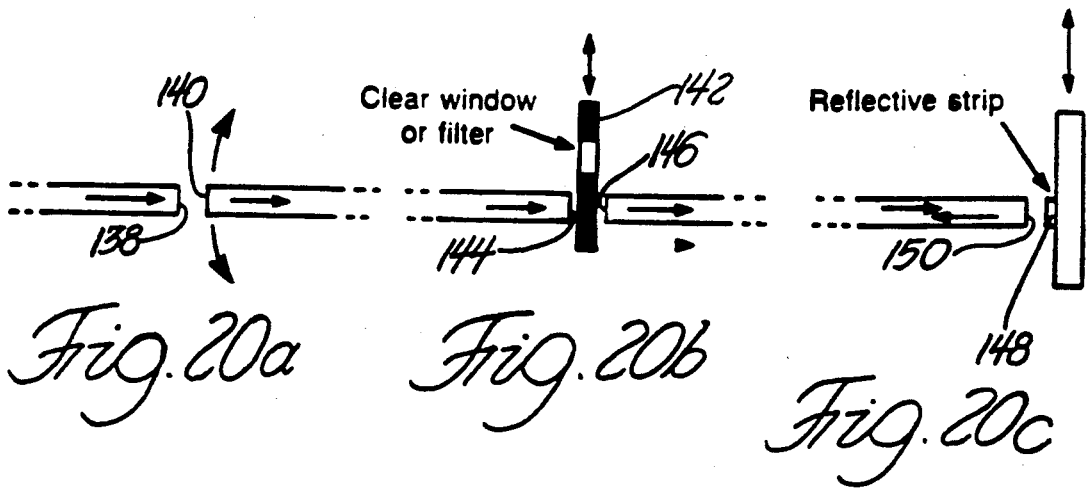
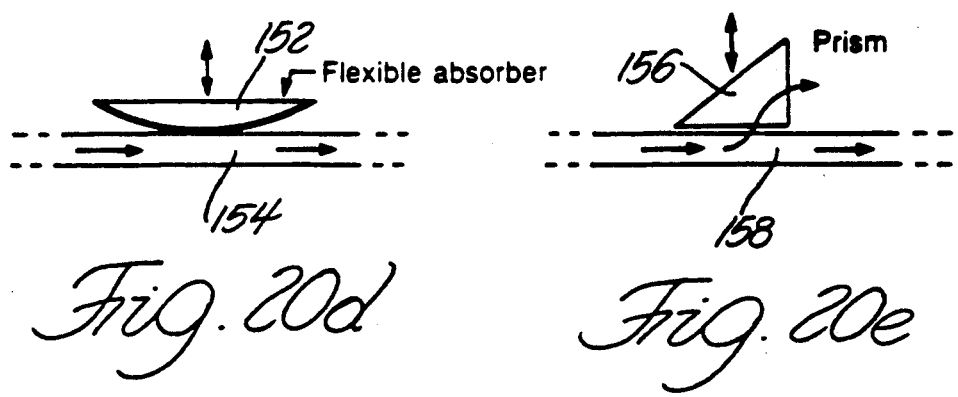
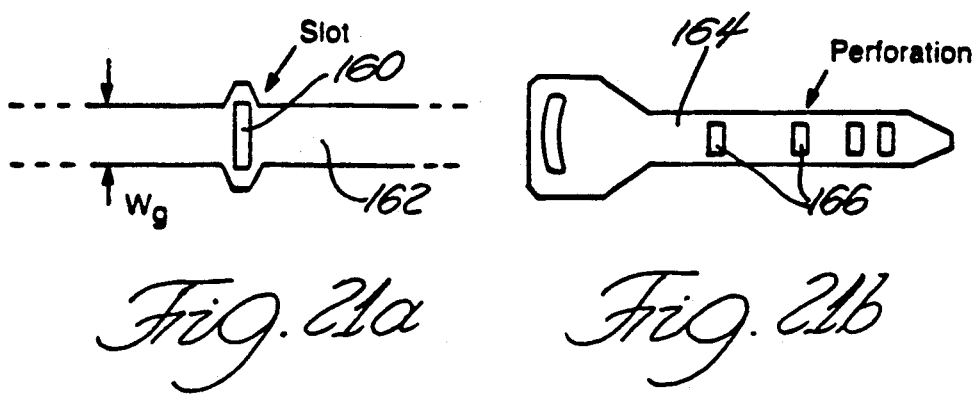

PLANAR POLYMER LIGHT GUIDE METHODS AND APPARATUS

This is a continuation-in-part of prior copending patent application Ser. No. 133,509 filed Dec. 16, 1987, now abandoned.

The present invention relates to light guides employing planar polymer material, and to various related components, applications, systems, processes and techniques.

Traditional fiber optic technology has come a long way since the original idea of transmitting data through optical links was conceived a few decades ago. Transmission loss in silica fibers went down from 1000dB/km in the late sixties to less than one dB/km in the eighties [1]. [Bracketed numerals refer to references listed at the end.] Such low loss fibers were originally intended for long distance communications, but their inherent advantages were soon applied to other end uses as well. For example, fiber optic based sensor concepts have enjoyed increasing popularity since they started emerging in the late seventies. Applications of fiber optic sensors now include: chemical [2-11], biological [2,10-14], position [2,15], rotation rate [16-18], acceleration [19,20], intrusion [21,11], pressure [23-28], temperature [28-30], electric field [31], and magnetic field [32,33].

Fiber optic specifications for sensing purposes do not necessarily match those for communication purposes. For communication applications the electromagnetic waves must propagate in the guiding medium of the fiber with as little interaction as possible with the outside medium. On the other hand, some sensing applications (such as chemical and biological sensing) necessitate strong interaction with the external medium to be sensed, at least over a portion of the fiber. In addition, the requirements of automotive applications differ substantially from those of communications applications.

The use of traditional fiber optic technology in automotive applications has been lagging, although limited fiber optic systems have already been implemented in some luxury car lines. Cost has been the major inhibiting factor. The substantial incremental expense is not perceived as value-added by the automotive customer.

The reasons for the high cost of fiber optic systems are numerous. Consider for example a simple automotive multiplex system using presently available fiber optic elements as shown in FIG. 1. Such a system consists of a main communication bus 10 out of which several data lines 12, 14, and 16 are tapped through 1×2 couplers 18, 20 and 22, respectively. The total system cost includes the cost of high technology fabricated optical fibers and couplers, as well as the high precision labor cost to put the whole system together (fiber cleaving, polishing, precision aligning, splicing, . . . ). Although transmission loss through the optical fibers is very low, the total system loss is not necessarily negligible because of the insertion loss introduced by each of the couplers. The large number of connections and/or splices will increase system loss (due to misalignment and possible index of refraction and geometrical incompatibilities) as well as decrease overall system reliability. The typical loss per splice can be as large as 1 dB when the splices are effected in a production environment that is not as controlled as a laboratory enviornment. In addition, a large inventory of components is needed for such systems, one reason being that different N×M couplers with different splitting ratios are needed in order to divide the main signal equally among the different branches. The approach proposed by the invention does not suffer from these drawbacks.

Communication applications require data transmission over long distances of at least a few kilometers with attenuation as little as one dB/km. In contrast, automotive applications feature much shorter data links, having much less stringent attenuation characteristics; but they may involve more complicated network topology including multiple couplers, connectors, and splices. While fiber optic technology is very suitable for communication applications, a more cost effective approach is needed for automotive applications. The instant invention provides such an approach.

SUMMARY OF DRAWING FIGURES

FIGS. 7a and 7b show light guide strips embodying the principles of the invention.

FIGS. 8a, 8b and 8c depict source-to-guide coupling arrangements useful in conjunction with the invention.

FIGS. 17a, 17b, 17c and 17d relate to various intensity-modulated sensors based on reflectivity that are achievable within the invention.

FIGS. 18a, 18b and 18c relate to one type of intensity-modulated sensor based on microbending that may be achieved within the invention.

FIGS. 19a, 19b and 19c relate to another type of intensity-modulated sensor based on microbending that may be achieved within the invention.

FIGS. 20a, 20b, 20c, 20d and 20e illustrate various switching arrangements achievable within the invention. FIGS. 21a and 21b illustrate a locking arrangement achievable within the invention.

Figure 22A:
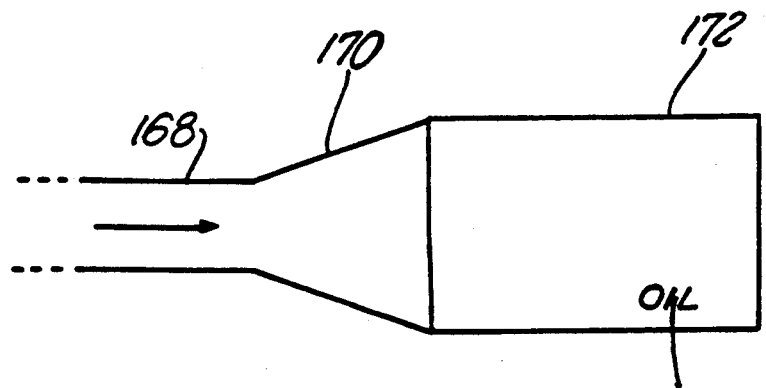
Figure 22B:
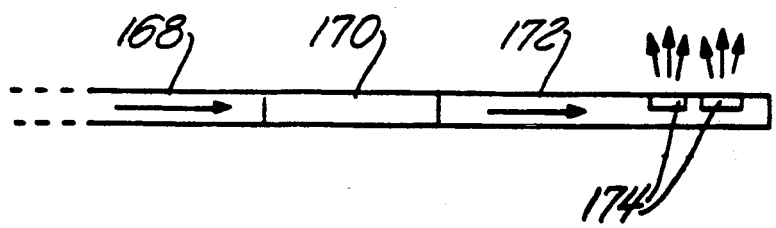
Figure 22C:
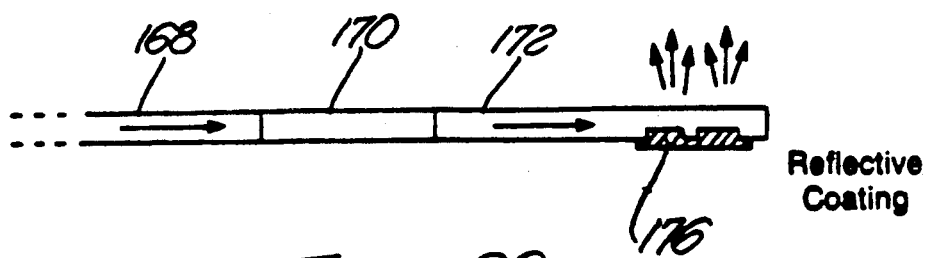

FIGS. 22a, 22b and 22c relate to display arrangements that may be achieved within the invention.

Figure 23:
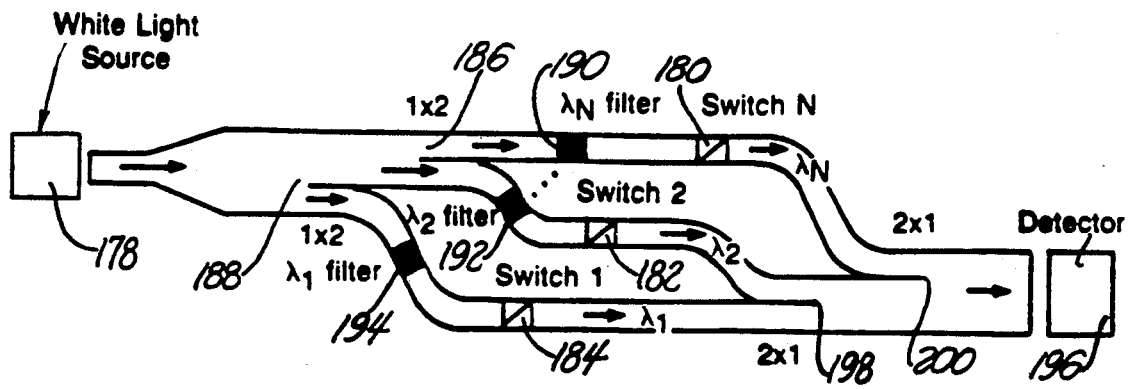

FIG. 23 illustrates a wavelength division multiplex system achievable within the invention.

Figure 24:
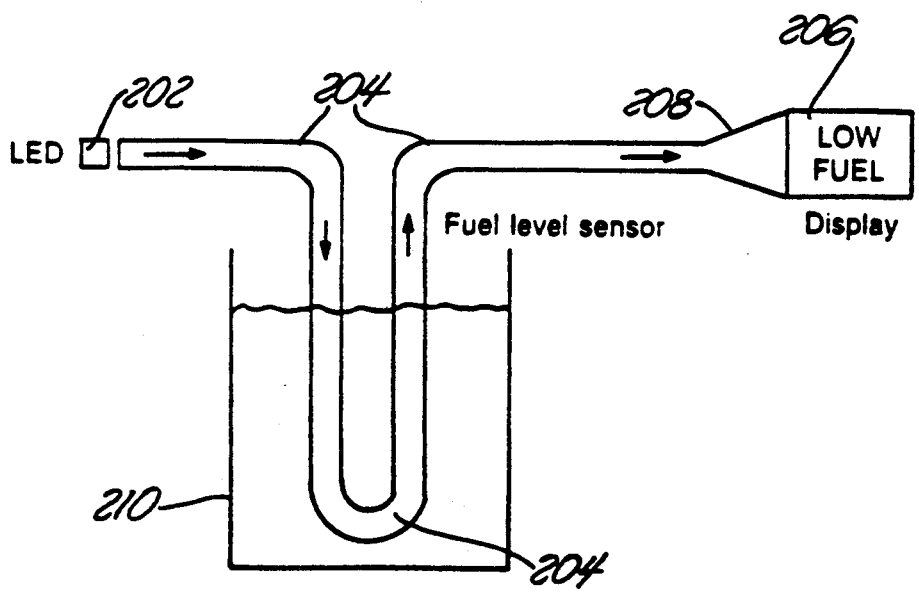

FIG. 24 depicts a sensor-display system that may be achieved within the invention.

INTEGRATED PLANAR POLYMER LIGHT GUIDES: CONCEPT AND FABRICATION ASPECTS

Figure 1:
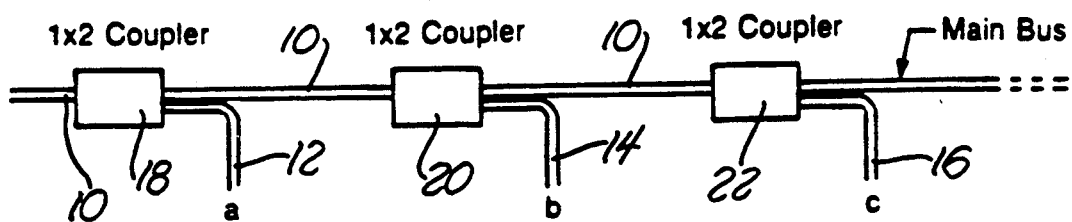
FIG. 1 illustrates a light guide network that may be achieved in accordance with the invention.
Figure 2A:
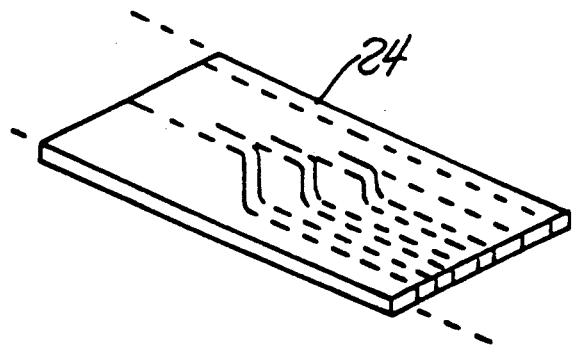
FIGS. 2a and 2b illustrate the steps by which the light guide network of FIG. 1 may be achieved.
Figure 2B:
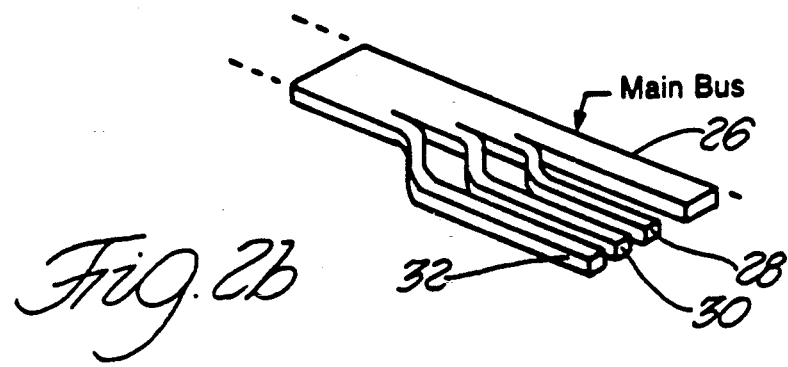

The concept of integrated planar polymer networks is very simple: The basic idea is to start with a thin planar clear polymer film, and literally cut out the light guide system to perform the desired functions. For example, the fiber optic multiplex system illustrated in FIG. 1 is easily obtained through planar technology by following the steps illustrated in FIGS. 2a and 2b. Specifically, a sheet of planar polymer film 24 is cut to form a main bus strip 26 and multiple branch line strips 28, 30 and 32. An alternative approach to obtain planar polymer light guide networks is by compression molding of optical grade resin in appropriately designed molds.

The planar polymer film 24 can be made of polycarbonate (index of refraction n=1.59), polymethylmetacrylate (PMMA, n=1.48-1.50), or polystyrene (n=1.60), all of which have desirable optical properties of clarity and low transmission loss, and all of which are now being utilized in fiber optics (as couplers and tapers) [37-44], bulk optics [45-47], and integrated optics [48,49]. While polycarbonate, PMMA, and polystyrene multimode optical fibers have transmission loss charactertistics exceeding silica fiber losses (typically greater than 140 dB/km in plastic fibers, compared to <1 dB/km in silica fibers), the plastic fiber losses are acceptable for automotive and other applications where total length is not more than a few meters. Comparable loss levels can be obtained in light guides cut out from the same polycarbonate, PMMA or polysterene plastic material. One can even allow for more lossy guides and yet obtain an overall system efficiency comparable to, if not better than, fiber optic system efficiency (because in the integrated network there are no losses at junctions and couplers). Lower tolerance requirements during fabrication, and therefore lower cost, are gained by relaxing the loss specifications.

Figure 3:
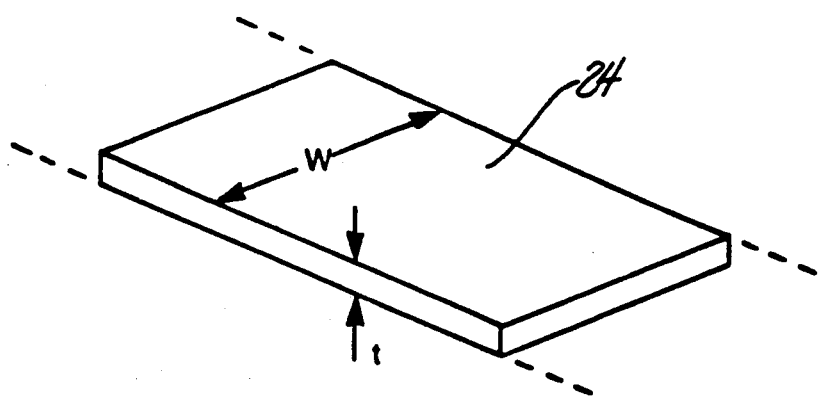
FIG. 3 shows an uncut polymer film of the kind that may be used in practicing the invention.

Referring to FIG. 3, the uncut polymer film 24 may have thickness 't' up to about 500 microns, and width 'W' up to a few centimeters to allow for design flexibility. This type of film cross-section can be obtained with sufficient resolution by presently available slit-die plastic extrusion techniques [50,51].

Figure 4:
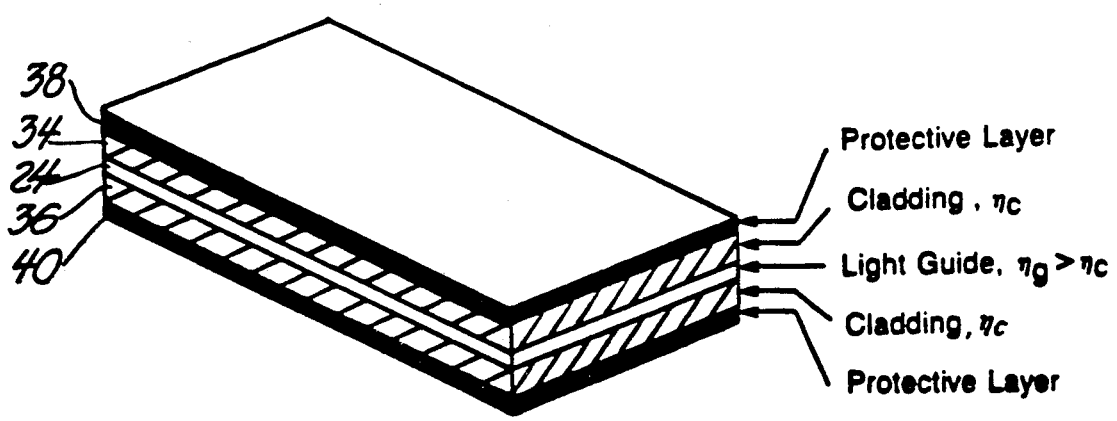
FIG. 4 shows the addition of cladding and protective layers to the polymer film of FIG. 3.

Referring to FIG. 4, as in fiber optics, 'cladding' layers 34 and 36 and protective layers 38 and 40, with lower index of refraction, may be provided on each side of the film 24 (e.g., $n_g > n_c$ where $n_g$ is the index of refraction of the light guide 24 and $n_c$ is the index of refraction of the cladding layers 34 and 36). The cladding layers 34 and 36 and the protective layers 38 and 40 insure that light is confined to the guiding medium with little interaction with the outside, provide protection from environmental corrosive or contaminating materials, and provide mechanical support and strength. The cladding and protective layers 34-40 can be extruded simultaneously with the light guiding polymer through widely used coextrusion techniques [50-53]. Alternatively, these layers can be added after cutting the network, through dipping or embedding processes [48,49,54]. The advantage of the latter processes is that they provide more design and manufacturing flexibility. In some sensor applications, guided light must interact with the exterior of the guide over some distance. In display applications, light must scatter out of the guiding medium. In these cases, the guiding medium can be masked over the sensing and display portions, before adding the cladding and protecting layers. Another advantage of adding these layers after cutting the network is that this process will provide cladding and protection to the cutout edges, thereby minimizing radiation loss from the sides.

Figure 5:
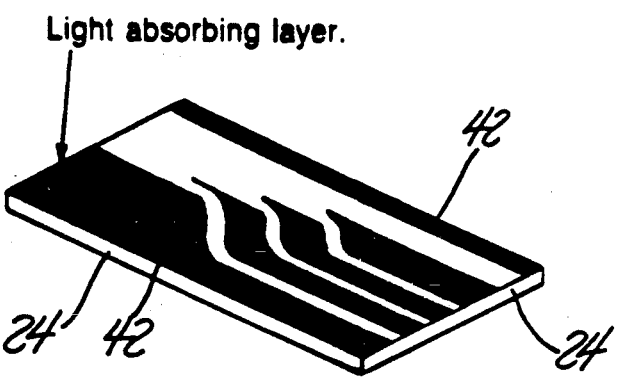
FIG. 5 depicts a light guide network according to the invention which is achieved by coating rather than cutting.

Cutting the desired network may be achieved by one of many possible techniques, including die-cutting (steel-rule, matched metal, or rotary dies), stamping, molding, hot knife or hot wire cutting, lithography, or laser cutting. It is also possible to avoid cutting altogether, by coating the non-guiding parts with an absorptive material 42 such as black paint, as illustrated in FIG. 5. However, this is not a very efficient approach as a significant portion of the injected power is lost in the non-guiding medium. Furthermore, cross-talk might be a problem in such uncut networks.

Figure 6:
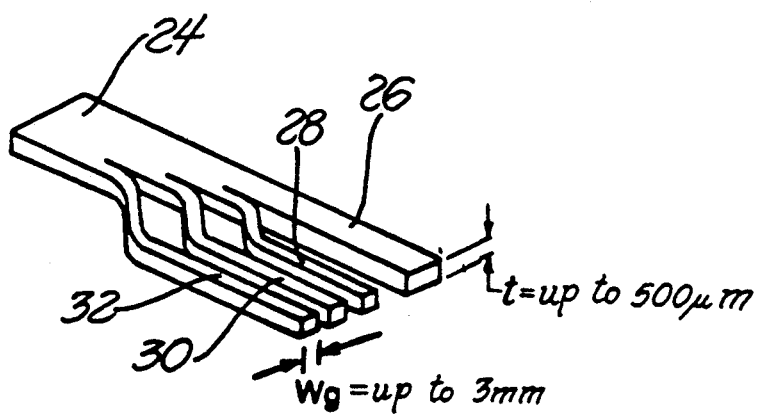
FIG. 6 illustrates one embodiment of a light guide network according to the invention.

Referring to FIG. 6, the thickness t of each individual light guiding strip 26-32 is the same as that of the uncut film 24 (up to about 500 microns). The typical width '$W_g$' of the branch line strips 28-32 can be up to about 3 millimeters. Primary and secondary busses, as well as sensors, displays, and other special elements, can have larger widths. Alignment and interfacing at the network extremities is easier with this type of rectangular light guide cross-section than in conventional fiber optics, mainly because of the larger cross-sectional area to work with, and because of the one dimensional nature of the alignment process.

The cross-sectional dimensions of the light guides 28-32 (a few hundred microns thick, and a few millimeters wide) are chosen as a compromise between dimensions encountered in fiber optic and integrated optic technologies on one hand, and bulk optic and sensor technologies on the other hand. These dimensions, as well as the rectangular cross-section of the light guides, are much easier to work with than the appreciably smaller dimensions and circular geometries of conventional optical fibers. Of course, one loses the very low loss and single mode features and their associated advantages, but these are not necessarily needed for most automotive and other relatively short-length applications (unlike in long haul communication systems where signals are to be sent over very long distances with minimal power loss and pulse distortion).

Compression molding is an alternative fabrication technique to obtain the light guide networks of the invention. Here, it is not necessary to start with a thin polymer film. This step is bypassed by directly compressing raw optical grade polycarbonate, polymethylmetacrylate, or polystyrene resins into molds with the desired geometries. Different bulk optics parts and components are now fabricated through a compression molding process [45,47]. One advantage of this fabrication technique is that it provides a three dimensional capability, and therefore, more design flexibility. Different portions of the network can be made with different thicknesses, but these portions will have to be interfaced through tapered sections. One potential disadvantage of compression molding as compared to film cutting is that a separate set of molds is needed for each network design, whereas some cutting tools such as lasers can be programmed to cut different shapes.

It is possible that unwanted stresses could be generated in the light guide network during the manufacturing process. Stress induced strains generate perturbations in the index of refraction profile which affect the light guiding properties of the medium. An annealing stage will remove any stress generated strain (the whole network is brought up to the glass transition temperature of the thermoplastic material and then cooled down).

ADVANTAGES AND DISADVANTAGES OF PLANAR LIGHT GUIDE NETWORKS

ADVANTAGES

The fabrication process of planar optical networks lends itself to very large volume automated manufacturing, considerably lowering the manufacturing cost. The whole network is produced basically as a single part. There is no need for professionally skilled labor (and its associated high cost) for integrating the network from discrete parts such as optical fibers and couplers. There is no need for professionally cleaved and polished fiber ends. There is no need for a large inventory of individually packaged, properly terminated, and tested components. There is no need for special fiber-to-fiber alignment techniques. There is no need for splicing. Insertion loss due to misalignment or mismatch in either the geometrical dimensions or index of refraction is nonexistent within the network. Interfacing at the network extremities to light sources and detectors is not difficult, because of the large cross sectional dimensions and numerical aperture, and because the planar nature of the light guides lends itself to alignment in one dimension only. Overall system reliability is improved (and variability is reduced) in comparison to fiber optics systems, because no connectors, splices, and individual parts are needed within the network.

Integrated polymer light guide networks are application specific. They extend the one dimensional geometry of optical fibers into two dimensions, thus offering tremendous versatility when designing systems that may integrate data communication, sensing, switching and display functions. The accessibility, flatness, and comparatively large width of the light guide surfaces are very desirable features, allowing bulk optic parts, sensors, and switches to be mounted or embossed right on the surface. For sensors and displays, the area can be as large as needed, and the geometry is flexible so as to accommodate external constraining factors. In some sensing applications, such as liquid level sensing and position sensing, a whole fiber optic bundle would be necessary to perform the same function performed by a single adequately designed planar light guide.

In addition to the advantages listed above, the proposed planar optical networks enjoy the same advantages that have made conventional fiber optic networks attractive: immunity to eletromagnetic interference (EMI), light weight, moderately high data rates, and low power consumption.

DISADVANTAGES

One less desirable feature of planar light guide networks is that they fail when the temperature exceeds the glass transistion temperature of the polymer. This limitation is not of major concern in most automotive applications. Even in those cases where the temperature is expected to be locally high, planar polymer networks can still be used in conjunction with silica fibers. The polymer part will be the major constituent in hybrid networks, accounting for couplers, tapers and the more complicated components, while the silica fiber extensions are only used in the harsher environment. A similar concept utilizing silica and plastic fibers, has been disclosed for a combustion pressure sensor system (where the aluminum-coated, temperature-resistant silica fiber is used only in the sensing portion of the network, i.e., in the high temperature combustion chamber pressure environment) [23]. This type of arrangement is favorable because it reduces the overall cost of the system.

Another potential disadvantage of planar polymer networks is that their long term stability may be affected by environmental factors such as humidity and exposure to chemicals. However, these effects can be reduced or eliminated by protecting the light guide with a chemically resistant layer. The same coating can be used to enhance the mechanical stability of the network. Even in those sensing applications where guided light needs to interact with the outside environment, such as in chemical and liquid level sensing, it is possible to sense indirectly through a chemically resistant interaction layer whose optical properties (index of refraction) respond selectively and reversibly to the medium to be sensed.

EXAMPLES OF INTEGRATABLE PARTS AND COMPONENTS

A large number of specific parts and components that are integratable into planar light guide networks can be identified. These include all-purpose components such as the basic light guide strips, and a whole assortment of sensors, switches, and displays.

ALL PURPOSE COMPONENTS

Light Guide Strips: These are the most basic light guiding elements. The waveguiding property of these strips is best explained in terms of ray optics and total internal reflection at the interface between two media, the guiding medium being of higher index of refraction [1,48,55,56]. Referring to FIG. 7, the guiding strips 44 can be straight with different widths $W_g$ (FIG. 7a), or tapered (FIG. 7b). Straight guides are used as waveguides to deliver light to different portions of the planar network. They play the same role as that of the optical fiber in fiber optic networks. Tapered guides are particularly useful as transitions between straight guides of different widths, as well as in linear-to-planar coupling applications where the planar section is part of a sensing, switching, or display element. Tapered guides are very difficult in conventional fiber optics.

Source-to-Guide Couplers: Referring to FIG. 8, light from an external source can be launched into the guiding medium either directly or indirectly. Direct coupling is achieved when the incident beam is focused by a lens 46 on an exposed cross-section of the light guide 44, as in FIG. 8a. A focusing lens 46 may not be needed because of the large cross-section (relative to a fiber optic cross-section) of the light guide 44. A tapered section (FIG. 7b) is another direct way of coupling between the source and the guide. As for the case of a focusing lens 46, it is useful in those applications where the cross-section of the beam delivered by the source is larger than that of the guide 44. The rectangular cross-section of the light guides 44 is not inconvenient for source-to-guide coupling purposes. In fact, rectangular core optical fibers for some communication systems have been found to be advantageous for compatibility with terminal devices [57].

Indirect coupling is achieved when light is incident obliquely onto one of the flat surfaces of the guide 44, either through a prism 48 (FIG. 8b), or through a grating 50 (FIG. 8c). These indirect coupling techniques are commonly used in integrated optics applications [48]. Indirect coupling is very difficult in conventional fiber optics, because it is not easy to access the core of the fiber.

Figure 9A:
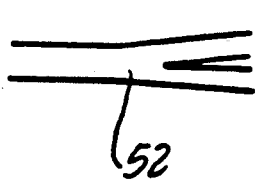
FIGS. 9a, 9b, 9c and 9d show guide-to-guide coupling arrangements achievable within the invention.
Figure 9B:
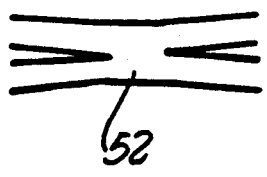
Figure 9C:
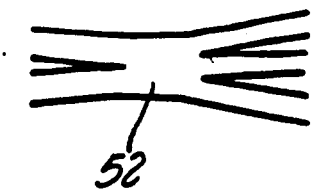
Figure 9D:
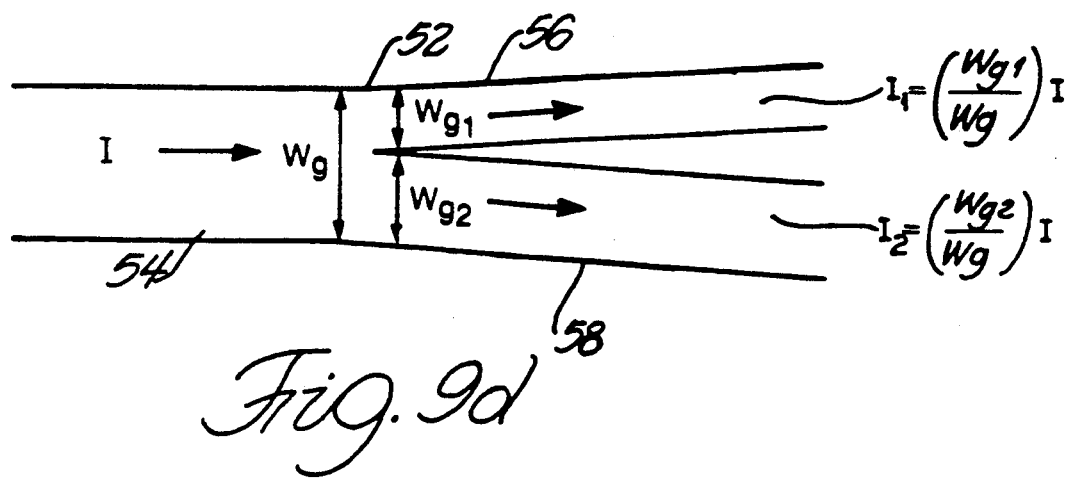

Guide-to-Guide Couplers: There are two types of guide-to-guide couplers: coplanar, and stacked. In coplanar couplers, as shown in FIG. 9, all the guides from which and to which light is being coupled are cut from the same planar film 52. Compared to fiber optic couplers, insertion loss and reflection are minimal with this type of NxM coupler because it is cut as an integral part of the whole network. There is no misalignment or mismatch in the index of refraction between the coupler and the converging and diverging light guides. Among the many design choices, the coupler may be 1×2 (FIG. 9a), 2×2 (FIG. 9b), or 2×3 (FIG. 9c). For each specific application, different coupler splitting ratios can be simply obtained by appropriately selecting the relative widths of each of the guides (FIG. 9d). Referring to the 1×2 coupler of FIG. 9d, light of intensity I in input light guide 54 of width $W_g$ is split into light of intensity $I_1 = (W_{g1}/W_g)I$ in light guide 56 of width $W_{g1}$, and light of intensity $I_2 = (W_{g1}/W_g)I$ in light guide 56 of width $W_{g1}$, and light of intensity $I_2 = (W_{g2}/W_g)I$ in light guide 58 of width $W_{g2}$. This is a strong advantage over fiber optics, where a large inventory of N×M couplers (2D array) with different splitting ratios would be needed to accommodate most applications.

Figure 10:
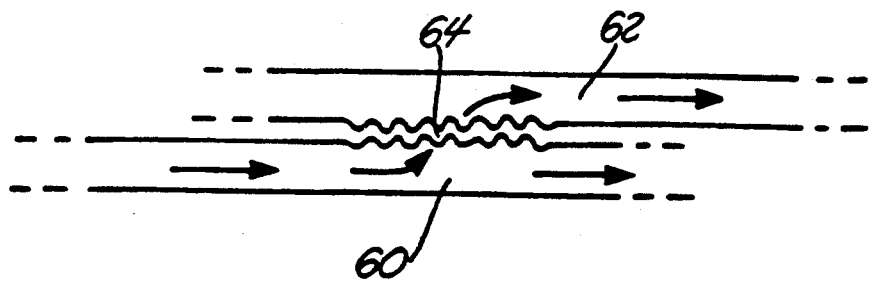
FIG. 10 shows a stacked coupler arrangement achievable within the invention.

Stacked couplers, as shown in FIG. 10, are obtained by coupling light from one set of guides 60 into another set of guides 62 through the opposing flat surfaces of the guides. This can be achieved either by forward scattering through induced irregularities in the surfaces of the guides, or through a grating 64. These techniques are borrowed from integrated optics technology [48]. Irregularities and gratings can be stamped or etched right onto the surface of the polymer film [48].

Figure 11A:
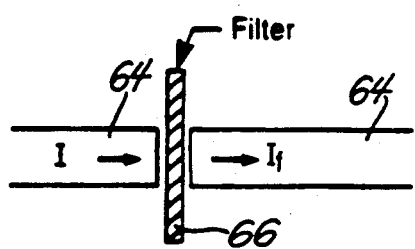
FIGS. 11a, 11b, 11c and 11d depict various filter arrangements achievable within the invention.
Figure 11B:
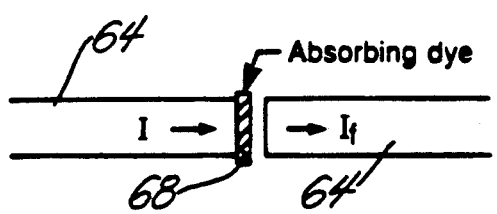
Figure 11C:
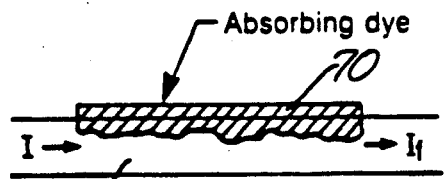
Figure 11D:
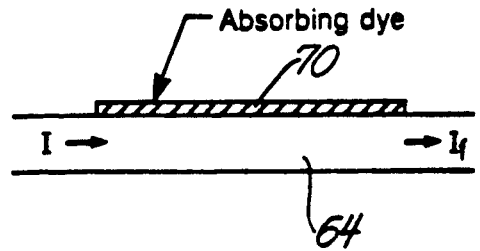

Filters: Referring to FIG. 11, filters are essential elements that are particularly useful in wavelength division multiplexing applications. The most obvious way of filtering is to cut the light guide 64 and insert a filter 66 with the desirable filtering characteristics (FIG. 11a), or coat the end of one light guide with a dye 68 that absorbs all wavelengths except those that need to be passed (FIG. 11b). Unfortunately, neither of these techniques is very efficient, as part of the filtered light is scattered without being relaunched into the receiving light guide. It is, however, possible to filter guided light without cutting—through a novel design. This is achieved by coating the flat surface of the guide 64 with a filtering dye or ink 70 that contacts or penetrates the light guide 64 (FIG. 11c). It is important here to note that filtering can still take place even if the dye or ink 70 does not penetrate into the guiding medium 64 (FIG. 11d). This is achieved through attenuated total reflection (ATR), also called internal reflection spectroscopy (IRS) [58-63], where the evanescent wave that penetrates the coating is absorbed by the dye 70, except at those wavelengths in the nonabsorptive spectrum of the dye. This effect is enhanced by bending the light guide (not shown), whereby lower order modes are converted to higher order modes. More specifically, the angle of incidence at the guide-dye interface is smaller in higher order modes, resulting in larger depth of penetration of the evanescent wave, therefore providing stronger interaction between the electromagnetic field and the dye 70. As discussed later, this ATR filtering technique can be generalized as a chemical sensor. In addition, it can be exploited for intensity modulation and switching purposes, either by bending, or by varying the interaction length at the dye-guide interface.

Figures 12A, 12B:
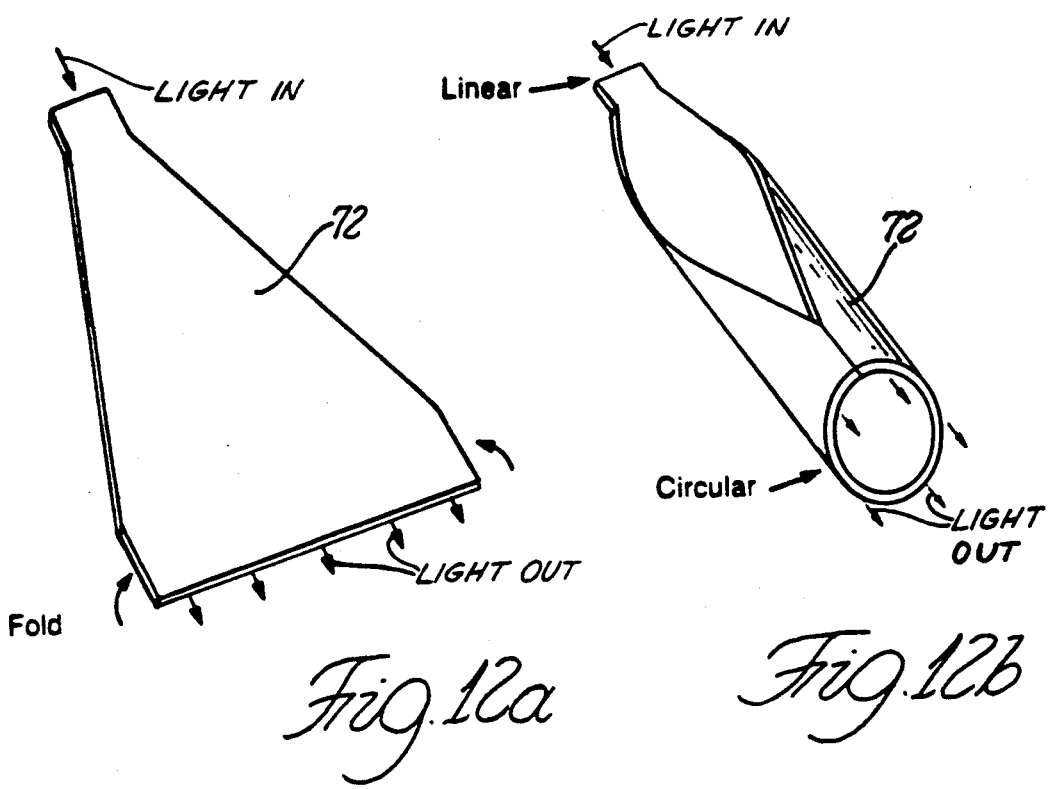
FIGS. 12a and 12b illustrate how a linear-to-circular light guide transition may be achieved within the invention.

Linear-to-Circular Transitions: Referring to FIGS. 12a and 12b, it is possible to generate a circular light ring by folding a tapered planar section of light guide 72. Circular light sources are important in applications where signals are to be transmitted from rotating to nonrotating parts, such as in the steering column of an automotive vehicle. An optical ring that performs a similar function has been installed on the Nissan Leopard, where it is used to transmit radio and cruise control switch information from the switch pad in the rotating steering wheel to a stationary receiver in the column [36]. Extension from linear to any nonlinear geometry is also possible using similar techniques.

Connectors: After a whole system has been cut out, plastic connectors with the desired geometries can be injection-molded directly onto the extremities of the network. The same injection-molding process can be applied to integrate some of the bulkier components.

SENSORS

Figure 13A:
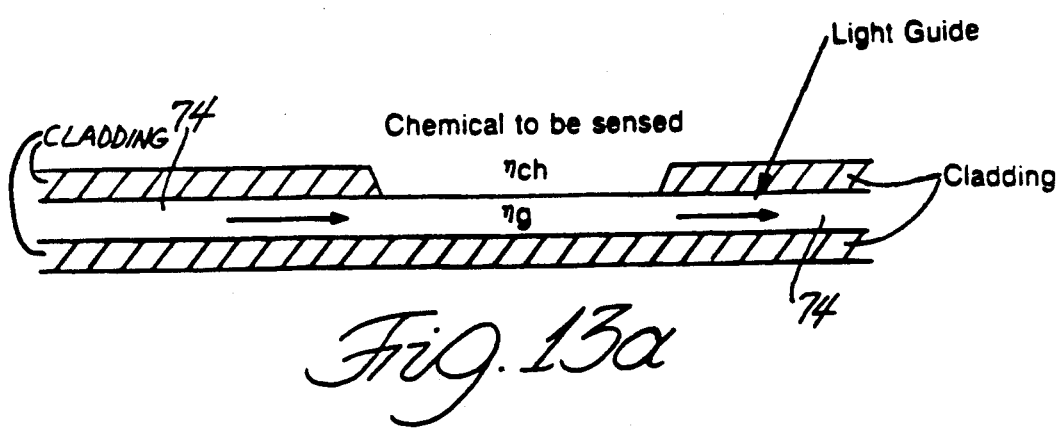
FIGS. 13a and 13b show one embodiment of a chemical sensor that may be achieved within the invention.
Figure 13B:
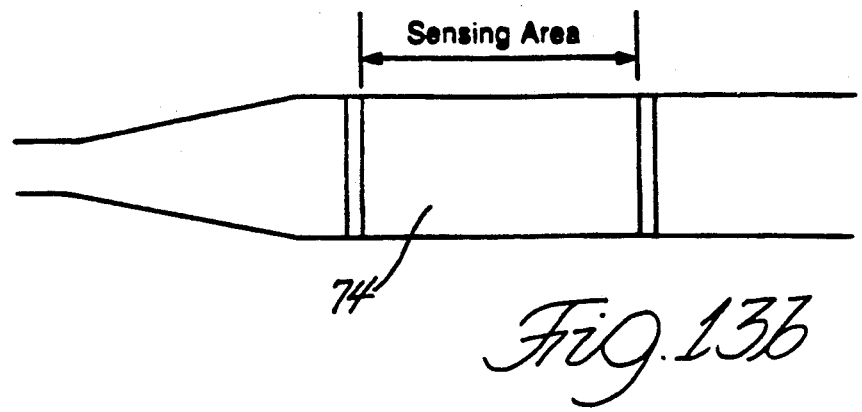
Figure 14:
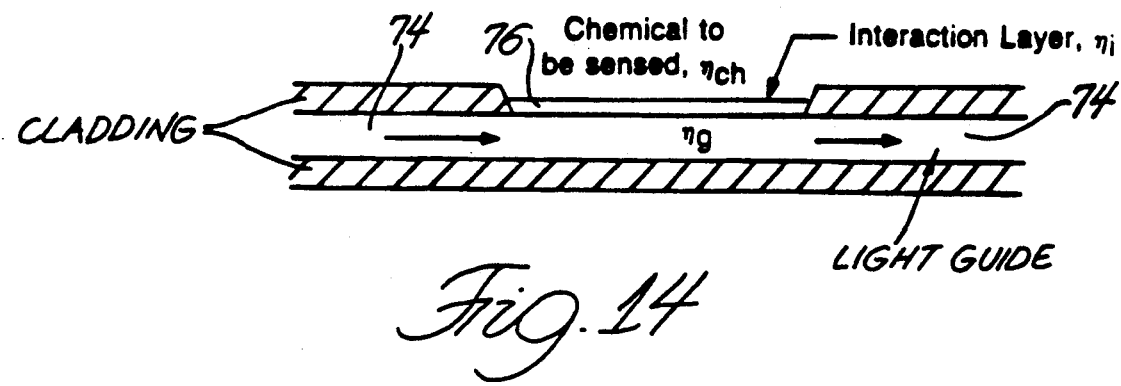
FIG. 14 shows another embodiment of a chemical sensor that may be achieved within the invention.
Figure 15A:
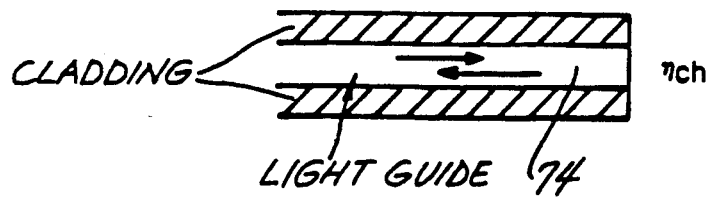
FIGS. 15a and 15b show a further embodiment of a chemical sensor that may be achieved within the invention.
Figure 15B:
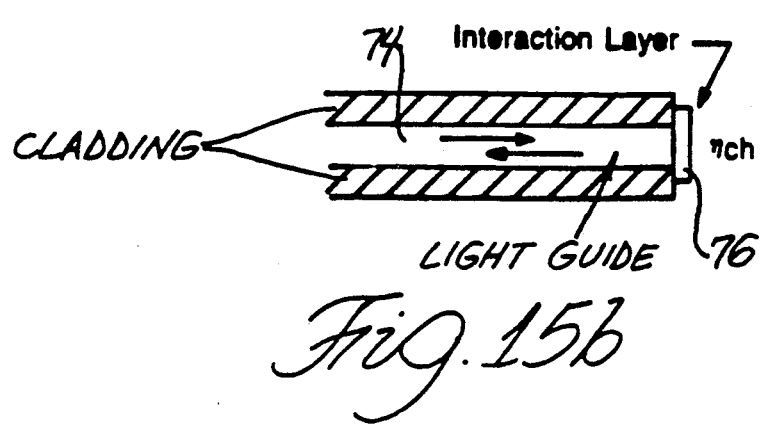

Chemical Sensors: Chemical sensing can be achieved directly (FIG. 13), or indirectly (FIG. 14), depending on whether or not the chemical to be sensed is in direct contact with the light guiding medium 74. Direct contact chemical sensing can be achieved through attenuated total reflection or internal reflection spectroscopy [58-62], evanescent field spectroscopy [9], or photorefractometry [14,64]. Indirect sensing can be obtained by selecting a transition film 76 whose optical properties (index of refraction) are selectively affected by the chemical to be sensed. Indirect sensing may be advantageous in those applications where the species to be sensed is chemically incompatible with polymers. In these cases, one can select a chemically compatible transition film 76 that acts as a buffer between the chemical and the light guide 74. As in filtering, the sensing mechanism can be enhanced by converting lower order modes to higher order modes, such as by bending. The sensing portion can be at the flat surface of the guide (FIGS. 13 and 14), or at an exposed cross section of the guide (FIG. 15). Both types of direct and indirect chemical sensors are now popular in fiber optics [6-10, 62-64]. However, regardless of the sensing mechanism, a novel aspect of the planar light guide technology is that chemical sensors can be made more sensitive than fiber optic sensors because the interaction area can be appreciably larger, whether at the flat surface, or at the exposed cross-section at the tip of the light guide.

Other types of chemical sensors are also possible, including differential absorption spectroscopy [3-5], remote fiber fluorometry [7], and fluorescence quenching [11].

Figure 16G:
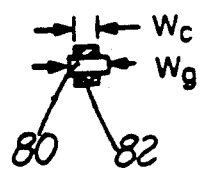
FIGS. 16a, 16b, 16c, 16d, 16e, 16f and 16g depict various liquid level sensing arrangements achievable within the invention.
Figure 16A:
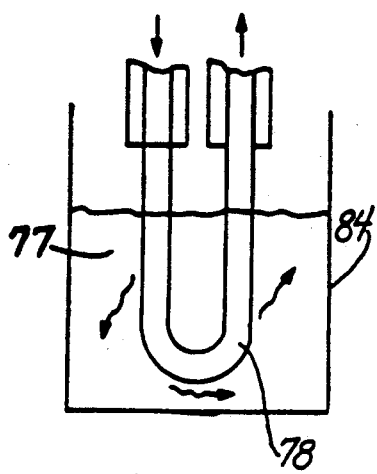
Figure 16B:
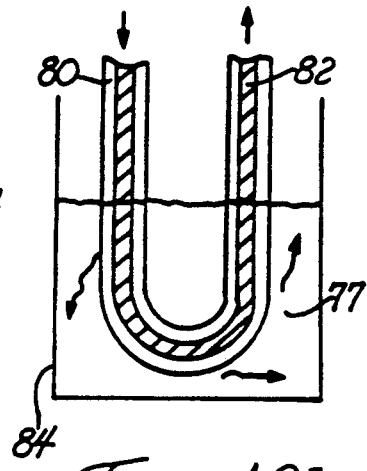
Figure 16C:
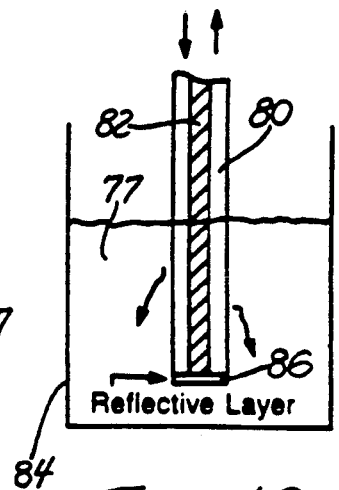
Figure 16D:
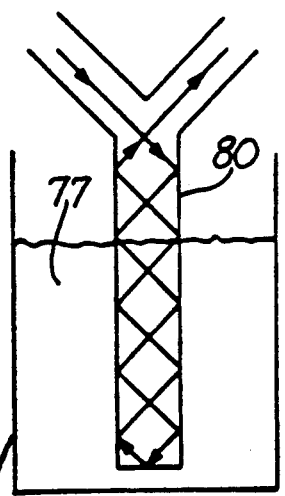

Liquid Level Sensors: These can be viewed as a special type of chemical sensor, and accordingly, all the concepts discussed above are applicable. One of the common ways to sense the level of a liquid 77 using fiber optics technology is illustrated in FIG. 16a, where the core of the fiber 78 is exposed, and optical losses are induced at the core-liquid interface [2,8]. However, it is extremely difficult to expose the fiber optic core. Furthermore, conventional silica cores are extremely fragile when exposed to atmospheric moisture. It is also difficult to adjust the radiation loss per unit length to obtain the desired sensitivity. A similar transmission type liquid level sensor can be obtained with planar light guide technology, based on attenuation of guided light due to radiation loss at the liquid-guide interface (FIG. 16b). Unlike its fiber optic counterpart, a novel feature of the planar sensor is that the radiation loss per unit length (and, therefore, the sensitivity) can be easily adjusted to the desirable levels by varying the width of the guiding strip in contact with the liquid ($W_g - W_c$) where $W_g$ is the total width of the guiding strip 80 and $W_c$ is the width of the cladding layer 82 (FIG. 16g). More losses are obtained with larger interfaces. This novel feature is also useful for linearizing any nonlinearity in the response due to the geometrical shape of the liquid container 84. A variation of the above planar guide liquid level sensor is illustrated in FIG. 16c, where light is reflected from a reflective coating 86, rather than being transmitted through a U-shaped guide. Another variation is illustrated in FIG. 16d, where the attenuation per unit length of the light guide 80 is a function of the angle of incidence of the light.

Figure 16E:
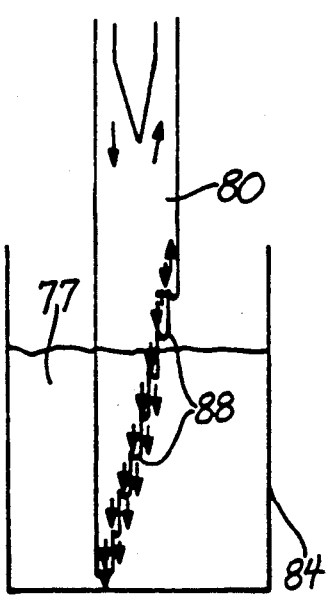
Figure 16F:
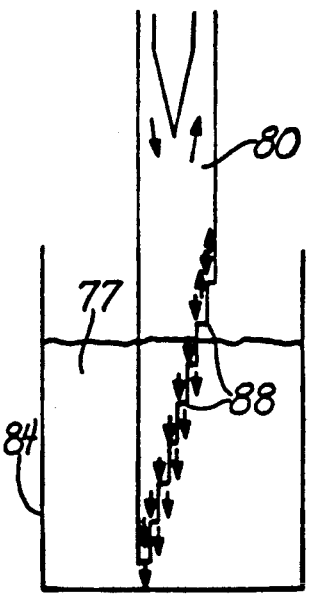

FIGS. 16e and 16f illustrate another way of sensing liquid level in which the core 80 is unexposed except at the tips of serrated teeth 88 lying along a tapered edge of the light guide 80. Light is passed into the liquid only at the exposed core tips 88 that are immersed. Light is reflected totally by total internal reflection (FIG. 16e), or partially (FIG. 16f), at the nonimmersed teeth 88. A fiber bundle is needed to perform similar functions using fiber optics technology.

Intensity-Modulated Sensors, Based on Reflectivity: Referring to FIG. 17, intensity modulation based on reflectivity may be obtained either by varying the distance between the sending-receiving ends of the sensor and the reflective surface (FIG. 17a), or by moving reflective strips laterally in the field of view of the sending-receiving ends of the sensor (FIG. 17b). The FIG. 17a type of sensor is useful for proximity sensing as well as for pressure sensing, where light is reflected from a deflected diaphragm. The FIG. 17b type of sensor is useful for position and rotation sensing. These types of sensors are now very popular in fiber optic systems [2,26].

In FIG. 17a, a light intensity modulator comprises a pair of light guides 90 and 92 formed from strips of polymer film disposed adjacent to each other. The distal ends of the guides 90 and 92 are spaced from a reflective member 94. The intensity of light received into the end cross-section of one of the light guides 90 and 92 due to reflection by the movable member 94 of light transmitted out of the end cross-section of the other one of the light guides 90 and 92 is modulated as a function of the distance between the movable member 94 and the ends of the light guides 90 and 92.

In FIG. 17b, an optical motion sensor comprises a light guide 96 formed from a strip of planar plastic having a distal end spaced from an object 98 having a plurality of reflective strips or surfaces 100. Light transmitted out of the end cross-section of the light guide 96 is received back into the end cross-section of the guide 96 by reflection from each surface 100 as the object 98 is moved laterally with respect to the guide 96.

One example of a novel differential position sensor that is difficult to obtain with conventional fiber optics is illustrated in FIG. 17c. Specifically, a reflective strip 102 is attached to the moving part 104 whose position is to be sensed. The width $W_r$ of the reflective strip 102 is chosen so that it slightly exceeds the expected maximum swing of the moving part 104. Similarly, the width $W_g$ of each of the sending-receiving ends 106 and 108 of the sensor, is selected to be equal to, or slightly in excess of, the width $W_r$. This configuration guarantees coverage of the maximal swings of the moving part 104 without loss of sensitivity. The differential output of the sensor 110 is illustrated in FIG. 17d. When the reflective strip 102 is equidistant to the two sensor ends 106 and 108, the two reflected light intensities $I_1$ and $I_2$ are equal and the differential output 111 is zero. When the strip 102 is fully aligned with one of the sensor ends 106 and 108, the reflected light is maximum at that end, and minimum at the other end, giving a maximum differential output. Because of its differential nature, this type of sensor is insensitive to intensity fluctuations in the light source. A complicated network of fiber optic bundles and couplers is needed to perform similar functions using fiber optic technology.

Referring to FIG. 17c, it will be noted that the sensor 110 comprises an M-shaped light guide formed of plastic film. The upper apexes of the M-shaped guide 110 are terminated in flat ends 106 and 108. Light introduced into the M-shaped guide 110 through the lower apex end 112 is split and transmitted out of each of the upper apex ends in equal intensity. The light is then reflected by the reflective strip 102 of the moving part 104 back into the respective upper apex ends 106 and 108 in proportion to the differential alignment of the reflective strip 102 with each of the upper apex ends 106 and 108. The light is then emitted from the respective lower outer ends 114 and 116 of the M-shaped guide 110. The position of the moving part 104 can be detected as a function of the difference ($I_1 - I_2$) between the light intensity $I_1$ emitted from the outer end 114 and the light intensity $I_2$ emitted from the outer end 116. To normalize the differential output 111, the light intensity difference ($I_1 - I_2$) is divided by the light intensity sum ($I_1 + I_2$).

Intensity-Modulated Sensors, Based on Microbending

Referring to FIG. 18a, microbending losses in optical waveguides are obtained by coupling guided modes into radiation modes by deforming the waveguide 118 with a corrugated microbending fixture 120. For coupling to occur, the spatial frequency of the periodic deformation must be equal to the difference between the propagation constants of the guided and radiated modes [65,66]. This type of sensor is useful for pressure and acceleration sensing, as well as for modulation and switching purposes without having to cut the waveguide and propagate light through free space. Fiber optic microbend sensors have gained popularity in many sensing applications [2,23,27,28]. Compared to fiber optic sensors, planar microbend sensors enjoy additional advantages because they may offer a larger interaction area, and because the contact area between the flat surface of the guide and the corrugated fixture is smoothed out over the width of the guide, unlike fiber optic sensors where the contact area is very small due to the curvature of the guide, possibly resulting in localized strains that may reduce the longevity of the sensor. Another advantage of the planar microbend sensor is that the sensing part of the guide can be cut to fit in fixtures with different geometries (FIGS. 18b and 18c).

Further, referring to FIG. 19, it is possible to etch the periodic corrugated structure directly onto the surface of the planar guide 122. Here, the corrugations 124 act as the periodic deforming structure on a thinner guide 126 when pressed with a flat fixture 128 (FIG. 19b). The advantage of such a novel configuration is that no alignment between the guide 122 and microbending fixtures 128 is necessary. FIG. 19c shows an analog of a conventional microbend sensor, with the corrugated structure 130 as a part of the microbend fixture 132 for deforming a thinned down portion 134 of the planar light guide 136. All purpose microbend sensitized polymer films of this type can also be fabricated using a low cost rotary die-cutting technique. These all purpose films can be cut to the desired size for each particular application. Applications include: Liquid mass sensing (at the bottom of a tank), intrusion sensing, and tactile sensing.

Intensity-Modulated Sensor, Based on Filtering: The filter concept based on attenuated total reflection, and described previously in respect to FIG. 11d, can also be used to produce intensity modulation. Here, the light absorbing dye is part of an external fixture that can be pressed against the light guiding core. The contact area of the filter medium and the core region is varied in proportion to the lateral contact force. A wide variety of force versus intensity characteristics can be obtained through variation of the contact profile. The modulation has a switch behavior when the contact area changes abruptly. This novel feature is useful for switching purposes, as illustrated in FIG. 20d in the following section. Another modulation scheme is by bending of the light guide, where the absorbing dye (such as a black coating) is now applied directly to the surface of the guide. The more the bending radius, the more efficient is the conversion from lower to higher order modes, resulting in stronger attenuation.

SWITCHES AND LOCKS

Switches: Referring to FIG. 20, the simplest on-off switching operations are obtained by selective alignment and misalignment of two planar guide ends 138 and 140 that act as a sending-receiving pair (FIG. 20a), by selective insertion and removal of an obstructive element 142 in the optical path between two planar guide ends 144 and 146 (FIG. 20b), and by selective insertion and removal of a reflective element 148 from a guide end 150 (FIG. 20c). Each of these techniques necessitates an optical path section in free space. Filter elements can be inserted in the free space optical path and exploited for wavelength division multiplexing purposes. Other switching techniques are also possible in an all guided wave system with no free space propagation. These include switching by microbend-induced losses as discussed above, switching by attenuated total reflection (ATR) induced losses when a light absorbing medium 152 contacts the surface of the planar guide 154 (FIG. 20d), and switching by frustrated total internal reflection (FTIR) induced losses when a contacting prism 156 couples light out of the planar guide 158 (FIG. 20e). FTIR spectroscopy denotes those cases where the evanescent field is attenuated by means other than absorption [62], such as when coupling through a gap between adjacent optical elements [25], when the gap is comparable to, or less than, the depth of penetration of the evanescent wave.

Locks: Referring to FIG. 21, optical locks are easily obtained by cutting a slot 160 across the width of the planar guide 162 where a key 164 is to be inserted. When the key 164 is inserted into the slot 160, light emerging out of the slot-key combination is modulated by transparent coded perforations 166 in the key 164.

DISPLAYS

Displays and Warning Lights: Referring to FIG. 22, a planar guide 168 is terminated through a tapered strip 170 into a flat panel display 172. Light is trapped in the display 172 by total internal reflection in a similar fashion as in the light guides 168 and 170. However, light will scatter out of the display 172 at those locations 174 where the surface is etched or embossed, as illustrated in FIG. 22b. Different patterns can be embossed or etched onto the surface (e.g., "OIL"). Scattering can be enhanced by etching the back surface of the display and coating with a reflective layer 176, as illustrated in FIG. 22b. This way of delivering light to displays has its advantages. The light source can be located anywhere, i.e., it can be located some place where it is easily accessible in case it burns out or otherwise malfunctions. This type of arrangement can also help to reduce the congestion problem in the instrument panel of an automotive vehicle.

EXAMPLES OF SYSTEMS

A large number of planar light guide networks can be configured with different combinations of the above assortment of integratable parts and components. Wavelength division multiplexing as well as time division multiplexing networks can be configured for data communication, sensing, switching, and display purposes. The following are examples:

Time Division Multiplex System for Data Communication: The multiplex network illustrated in FIG. 2 can be used as a transmission medium where peripheral electronic devices can communicate using time coded signals.

Wavelength Division Multiplex Switching System: A typical wavelength division multiplex system is illustrated in FIG. 23, where light from a broadband source 178 is branched out to the different switches 180, 182, and 184 through 1×2 couplers 186 and 188. Filters 190, 192 and 194 with nonoverlaping bands are used to differentiate between the switches 180, 182 and 184, respectively. Attenuated total reflection filters, as illustrated in FIG. 11d, are suitable for this purpose. The switches 180, 182 and 184 can also be of the attenuated total reflection type (FIG. 20d). However, it is possible to combine both filtering and switching operations if the obstruction switch illustrated in FIG. 20b is used. The switches 180, 182 and 184 are connected to a detector 196 through 2×1 couplers 198 and 200.

Sensor-Display System: FIG. 24 illustrates a very simple system that integrates both sensing and display functions. It is a low fuel indicator system. Light from LED (light emitting diode) 202 travels through planar light guide 204 and illuminates the 'LOW FUEL' indicator etched in the flat panel display 206 which is connected to the light guide 204 via tapered section 208. The intensity of the illumination is dependent upon the fuel level in the tank 210. Maximum intensity is achieved when the fuel tank 210 is fully empty as sensed by the planar light guide fuel sensor formed by the looped section of the guide 204 (FIGS. 16a and 16b). More complex sensor and/or display systems are also possible.

REFERENCES

[1] Technical Staff of CSELT, *Optical Fiber Communication*, McGrawHill Book Company, New York, 1981.

[2] T. G. Giallorenzi, J. A. Bucaro, A. Dandridge, and J. H. Cole, "Optical-Fiber Sensors Challenge the Competition," IEEE Spectrum, pp. 44–49, September 1986.

[3] K. Chan, H. Ito, and H. Inaba, "An Optical-Fiber-Based Gas Sensor for Remote Absorption Measurement of Low-Level $CH_4$ Gas in the Near-Infrared Region," IEEE Journal of Lightwave Technology, Vol. LT. 2, No. 3, pp. 234–237, June 1984.

[4] H. Inaba, T. Kobayasi, M. Hirama, and M. Hamza, "Optical-Fibre Network System for Air-Polution Monitoring Over a Wide Area by Optical Absorption Method," Electronics Letters, Vol. 15, No. 23, pp. 749–751, November 1979.

[5] T. Kobayasi, M. Hirama, and H. Inaba, "Remote Monitoring of $NO_2$ Molecules by Differential Absorption Using Optical Fiber Link," Applied Optics, Vol. 20, No. 19, pp. 3279, 3273, October 1981.

[6] E. E. Hardy, D. J. David, N. S. Kapany, and F. C. Unterleitner, "Coated Optical Guides for Spectrophotometry of Chemical Reactions," Nature, Vol. 257, pp. 666–667, October 1975.

[7] F. P. Milanovich, and T. Herschfeld, "Remote Fiber Fluorometry: Using Optics for On-Stream Analysis," InTech, pp. 33–36, March 1984.

[8] D. A. Krohn, "Chemical Analysis With Fiber Optics," ISA, pp. 43–50, 1984.

[9] M. T. Wlodarczyk, D. J. Vickers, and S. Kozaitis, "Evanescent Field Spectroscopy with Optical Fibers for Chemical Sensing," SPIE Vol. 718, Fiber Optic and Laser Sensors IV, pp. 192–196, 1986.

[10] W. R. Seitz, "Chemical Sensor Based on Fiber Optics," Analytical Chemistry, Vol. 56, No. 1, pp. 16A–34A, January 1984.

[11] M. E. Cox, and B. Dunn, "Detection of Oxygen by Fluorescence Quenching," Applied Optics, Vol. 24, No. 14, pp. 2114–2120, July 1985.

[12] S. M. Angel, "Optrodes: Chemically Selective Fiber-Optic Sensors," Spectroscopy, Vol. 2, No. 4, pp. 38–48, 1987.

[13] J. I. Peterson, and G. G. Vurek, "Fiber-Optic Sensors for Biomedical Applications," Science, Vol. 224, pp. 123–127, April 1984.

[14] I. N. Ross, and A. Mbanu, "Optical Monitoring of Glucose Concentration," Optics and Laser Technology, pp. 31–35, February 1985.

[15] M. Okaji, and H. Imai, "An Automatic and Absolute Edge Position Measuring System Utilising Optical Fibre Sensor," The Institute of Physics, pp. 417–420, 1986.

[16] H. C. Lefevre, "Overview of Fiber Optic Gyros," SPIE Vol. 838, Fiber Optic and Laser Sensors V, 1987.

[17] W. K. Burns, "Fiberoptic Gyroscopes," Laser Focus/ElectroOptics, pp. 83–94, February 1984.

[18] E. Udd, "Fiberoptic Vs. Ring Laser Gyros: An Assessment of the Technology," Laser Focus/Electro-Optics, pp. 64–65, December 1986.

[19] C. M. Davis, J. G. Eustace, and C. J. Zarobila, "Fiber-Optic Seismometer," SPIE Vol. 718, Fiber Optic and Laser Sensors IV, pp. 203–211, 1986.

[20] M. Layton, E. F. Carome, B. A. Denver, J. D. Lastofka, and D. P. Devan, "Fiber Optic Accelerometer," SPIE Vol. 838, Fiber Optic and Laser Sensors V, 1987.

[21] C.-Y. Leung, C.-H. Huang, and I.-F. Chang, "Optical Fiber Security System: A Field Test Report," SPIE Vo. 838, Fiber Optic and Laser Sensors V, 1987.

[22] S. vL Henkel, "A Survey of Intruder Detection Technologies," Sensors, pp. 17–19, January 1988.

[23] D. J. Vickers, and M. Wlodarczyk, "Washer-Type, Microbend Combustion Pressure Sensor," SPIE Vol. 838, Fiber Optic and Laser Sensors V, 1987.

[24] G. E. Blonder, and R. A. Lieberman, "New Interferometric Pressure Optrode Design," SPIE Vol. 838, Fiber Optic and Laser Sensors V, 1987.

[25] K. T. V. Grattan, A. W. Palmer, and D. P. S. Saini, "Frustrated-Total-Internal-Reflection Fiber-Optic Pressure Sensor," Journal of Lightwave Technology, Vol. LT-3, No. 5, pp. 1130–1134, October 1985.

[26] C. M. Lawson, and V. J. Tekippe, "Fiber-Optic Diaphragm-Curvature Pressure Transducer," Optics Letters, Vol. 8, No. 5, pp. 286–288, May 1983.

[27] G. Oscroft, "Intrinsic Fibre Optic Sensors," SPIE Vol. 734, Fibre Optics 87, pp. 207–213, 1987.

[28] N. Lagakos, J. H. Cole, and J. A. Bucaro, "Microbend Bifer-Optic Sensor," Applied Optics, Vol. 26, No. 11, pp. 2171–2190, June 1987.

[29] D. A. Christensen, and V. A. Vaguine, "Fiber Optic Temperature Sensor Using Spectrial Modulation," SPIE Vol. 838, Fiber Optic and Laser Sensors V, 1987.

[30] M. Gottlieb, and G. B. Brandt, "Temperature Sensing in Optical Fibers Using Cladding and Jacket Loss Effects," Applied Optics, Vol. 20, No. 22, pp. 3867–3869, November 1981.

[31] J. Jarzynski, and R. P. De Paula, "Fiber Optic Electric Field Technology," SPIE Vol. 718, pp. 48–55, 1986.

[32] P. Akhavan-Leilabady, and M. Keur, "Single-Point Fiber Optic DC Magnetometer Capable of Multiple-Point Measurement," SPIE Vol. 838, Fiber Optic and Laser Sensors V, 1987.

[33] H. Okamura, "Fibre-Optic Magnetic Sensor Utilising Metal-Coated Fibre," Electronics Letters, Vol. 23, No. 16, pp. 834–835, July 1987.

[34] K. Sekiguchi, "Fiber Optic Application in Automobile," (Nissan), IEEE Conference "Electro/82", 27/6, pp. 1–9, 1982.

[35] Y. Matsuzaki, and K. Baba, "Development of Multiplex Wiring System with Optical Data Link for Automobiles," (Toyota), SAE 840492.

[36] R. E. Steele, and H. G. Schmitt, "Electromagnetic Compatibility Considerations in Optic Signa Transmission Systems," Int. J. of Vehicle Design, Vol. 6, No. 6, pp. 737–747, 1985.

[37] W. Weisner, "Data Communication With Low Cost Plastic Fiber Optic Components," SPIE Vol. 734, Fibre Optics 87, pp. 38–46, 1987.

[38] S. Fujimoto, "Recent Advances in Plastic Optical Fibers in Japan," SPIE Vol. 799, New Materials for Optical Waveguides, pp. 139–145, 1987.

[39] J. Dugas, M. Sotom, L. Martin, and J-M Cariou, "Accurate Charactization of the Transmissivity of Large-Diameter Multimode Optical Fibers," Applied Optics, Vol. 26, No. 19, pp. 4198–4208, October 1987.

[40] J. Conti Ramsden, R. M..Glen, R. T. Murray, "An Analysis of the Desirable Molecular Features for a Polymer Optical Fibre," SPIE Vol. 799, New Materials for Optical Waveguides, pp. 132–138, 1987.

[41] A. A. Boiarski, "Low-Cost 1×2 Fiber Optic Coupler Using Plastic Fiber," SPIE Vol. 838, Fiber Optic and Laser Sensors V, 1987.

[42] K. Imoto, H. Sano, and M. Maeda, "Plastic Optical Fiber Star Coupler," Applied Optics, Vol. 25, No. 19, pp. 3443-3447, October 1986.

[43] H. A. Roberts, and F. Gillham, "Fiber Optic Couplers for Multiplexing," Photonics Spectra, April and May 1984.

[44] T. Kurokawa, N. Takato, and Y. Katayama, "Polymer Optical Circuits for Multimode Optical Fiber Systems," Applied Optics, Vol. 19, No. 18, pp. 3124-3129, September 1980.

[45] R. W. Jans, "Acrylic Polymers for Optical Applications," SPIE Vol. 204, Physical Properties of Optical Materials, pp. 2-10, 1979.

[46] A. B. Romberger, T. T. Saito, K. E. Siengenthaler, B. W. Mullins, A. A. Shaffer, J. F. Hilbing, and C. D. Adams, "Damage Resistant Plastics: Widened Application Possibilities," SPIE Vol. 505, Advances in Optical Materials, pp. 209-220, 1984.

[47] "New Optical-Grade Polycarbonate and Acrylic Aimed at Lenses and Video Discs," Plastics Technology, pp. 21-23, October 1987.

[48] T. Tami, *Topics in Applied Physics*, Springer-Verlag, New York, 1975.

[49] R. Ulrich, H. P. Weber, E. A. Chandross, W. J. Tomlinson, and E. A. Franke, "Embossed Optical Waveguides," Applied Physics Letter, Vol. 20, No. 6, pp. 213-215, March 1972.

[50] S. Levey, *Plastic Extrusion Technology Handbook*, Industrial Press Inc., New York, 1981.

[51] J. H. Briston, *Plastics Films*, John Wiley and Sons, New York, 1974.

[52] T. Alfrey, Jr., E. F. Gurnee, and W. J. Schrenk, "Physical Optics of Iridescent Multilayered Plastic Films," Polymer Engineering and Science, Vol. 9, No. 6, pp. 400-404, November 1969.

[53] W. J. Schrenk, and T. Alfrey, Jr., "Some Physical Properties of Multilayered Films," Polymer Engineering and Science, Vol. 9, No. 6, pp. 393-399, November 1969.

[54] I. Ieby, "Thick Film Fiber Optics to Integrated Optics Interface," SPIE Vol. 176, Guided Wave Optical Systems and Devices II, pp. 155-160, 1979.

[55] D. Marcuse, *Light Transmission Optics*, Van Nostrand Reinhold Company, New York, 1982.

[56] D. Marcuse, *Theory of Dielectric Optical Waveguides*, Academic Press, New York and London, 1974.

[57] V. V. Cherny, G. A. Juravlev, A. I. Kirpa, and V. P. Tjoy, "Multimode and Single-Mode Optical Fiber Guides With Rectangular Core for Communication Systems," SPIE Vol. 176, Guided Wave Optical Systems and Devices II, pp. 173-177, 1979.

[58] T. Hirschfeld, "High-Sensitivity Attenuated Total-Reflection Spectroscopy," Applied Spectroscopy, Vol. 20, No. 5, pp. 336-338, September/October 1966.

[59] T. Hirschfeld, "Relationships Between the Goos-Hanchen Shift and the Effective Thickness in Attenuated Total Reflection Spectroscopy," Applied Spectroscopy, Vol. 31, No. 3, pp. 243-244, 1977.

[60] C. M. Paralusz, "Internal Reflection Spectroscopy," ASTM Stanrdization News, pp. 42-46, February 1985.

[61] N. J. Harrick, *Internal Reflection Spectroscopy*, Interscience Publishers, a division of John Wiley and Sons, New York, 1967.

[62] P. A. Wilks, Jr., and T. Hirschfeld, "Internal Reflection Spectroscopy," Applied Spectroscopy Reviews, 1(1), pp. 99-130, 1967.

[63] R. T. Holm, and E. D. Palik, "Internal-Reflection Spectroscopy," Laser Focus, pp. 60-65, August 1979.

[64] T. Takeo, and H. Hattori, "Fluid Observations With an Optical Fiber Photorefractometer," Japanese Journal of Applied Physics, Vol. 22, No. 12, pp. 1920-1924, December 1983.

[65] D. Marcuse, "Microbending Losses of Single Mode, Step-Index and Multiple, Parabolic-Index Fibers," B.S.T.J., Vol. 55, pp. 937-955, 1976.

What is claimed is:

1. A method of fabricating an integral planar polymer light guide network comprising the steps of:
    providing a sheet of planar polymer material, and
    cutting the sheet to form a light guide bus strip and one or more light guide branch strips integrally connected to the light guide bus strip thereby eliminating the need for individual couplers between the bus strip and each branch strip.

2. An integral light guide network comprising a film of plastic light guiding material which has been cut to form an integral coupling between N number of light guiding strips on one side of the coupling and M number of light guiding strips on the other side of the coupling in which the light intensity splitting ratio across the coupling between any one of the N number of light guiding strips and any one of the M number of light guiding strips is determined by the ratio of the widths of the individual light guiding strips.

3. An optical filter comprising: a polymer film light guide having a flat surface area, and a light absorbing dye coated on the flat surface area so as to produce optical filtering of light traveling through the light guide by attenuated total reflection in which the evanescent light wave that penetrates the coating is absorbed by the dye except at those wavelengths in the nonabsorptive spectrum of the dye.

4. An optical chemical sensor comprising: a film of plastic light guiding material having a surface area exposed to direct contact with the chemical to be sensed, and means for detecting the chemical via the exposed surface area by attenuated total reflection spectroscopy, internal deflection spectroscopy, evanescent field spectroscopy, or photorefractometery thereby providing a sensor offering greater sensitivity than comparable fiber optic sensors due to the larger area exposed to the chemical.

5. An optical chemical sensor comprising: a polymer film light guide, and a layer of interaction material covering a surface area of the light guide on one side and exposed to the chemical to be sensed on the other side where the index of refraction of the interaction layer is selectively affected by the chemical to be sensed so as to produce a corresponding change in the amount of light lost through the interaction layer thereby providing a sensor offering greater sensitivity than comparable fiber optic sensors due to the larger area exposed to the chemical.

6. A light intensity modulator comprising: a reflective member, and a pair of light guides formed from strips of polymer film disposed adjacent to each other and having their distal ends spaced from the reflective member for modulating the intensity of light received into the end cross-section of one of the light guides due to the reflection by the reflective member of light transmitted out of the end cross-section of the other one of the light guides as a function of the distance between the reflective member and the ends of the light guides.

7. An optical motion sensor comprising: an object a plurality of reflective surfaces, and a light guide formed from a strip of planar plastic having a distal end spaced from the object so that light transmitted out of the end cross-section of the light guide is received back into the end cross-section of the light guide by reflection from each reflective surface of the object as such surface moves past the end of the light guide.

8. A differential position sensor comprising: a relatively translatable member including a reflective surface having a width slightly in excess of the maximum relative translation of the member, an M-shaped light guide formed of plastic film in which the upper apexes of the M-shaped guide are terminated in flats each having a width that is slightly in excess of the width of the reflective surface and so located in respect to the relatively translatable member that the reflective surface is relatively translatable from a position fully aligned opposite one apex flat to a position fully aligned opposite the other apex flat, and means for introducing light into the M-shaped guide through the lower apex such that the light is split and transmitted out of each of the upper apex cross-sections in equal intensity and is then reflected by the reflective surface of the relatively translatable member back into the respective upper apex cross-sections in proportion to the differential alignment of the reflective surface with each upper apex flat and is then emitted from the respective lower outer ends of the M-shaped guide so that the position of the relatively translatable member can be detected as a function of the difference in the intensity of light emitted from the lower outer ends of the M-shaped guide.

9. A light intensity modulator comprising: a light guide formed of a strip of polymer film having periodic transverse corrugations formed in opposite flat surfaces of the guide in complementary phase relationship, and means including a flat microbending fixture through which the light guide extends for providing microbending action as the light guide is squeezed by a clamping force applied over the corrugations on each flat surface of the guide by the flat microbending fixture whereby alignment of the guide with the fixture is facilitated by the polymer film guide as compared to a fiber optic guide.

10. The light guide of claim 9 where the transverse corrugations are formed by a rotary die cutting.

11. A light intensity modulator comprising: a light guide formed of a strip of polymer film, and means including a corrugated microbending fixture through which the light guide extends such that the corrugations of the fixture are in transverse contact with the flat surfaces of the polymer film for providing microbending action as the light guide is squeezed by a clamping force applied by the microbending fixture thereby offering greater contact area and easier fit and alignment than would be possible with a fiber optic light guide.

12. A light intensity modulator comprising: a polymer film light guide, and means including a light absorbing filter medium in contact with a flat surface of the light guide so as to produce optical filtering action by attenuated total reflection for modulating the intensity of light transmitted through the light guide as a function of the contact area between the filter medium and the light guide.

13. An optical switch comprising: a pair of light guides each formed by a strip of polymer film terminating at an end, and means for selectively aligning and misaligning the ends of the light guides to respectively permit and prohibit the passage of light from one light guide to the other light guide.

14. An optical switch comprising: a pair of light guides each formed by a strip of polymer film terminating at an end where the end of one light guide is aligned with the end of the other light guide so as to pass light from one light guide to the other light guide, and means for selectively inserting and removing a light obstructive element between the ends of the light guides to respectively prohibit and permit the passage of light from one light guide to the other light guide.

15. An optical switch comprising: a light guide formed by a strip of polymer film, and means for selectively applying and removing microbinding induced losses in the light guide to respectively prohibit and permit the passage of light through the light guide.

16. An optical switch comprising: a light guide formed by a strip of polymer film terminating at an end through which light passes out of the light guide, and means for selectively placing and removing a reflective element at the end of the light guide to respectively enable and disable the reflection of light passing out of the light guide back into the light guide.

17. An optical switch comprising: a light guide formed by a strip of polymer film, and means including a light absorbing medium for selectively contacting the light guide with the medium and removing the medium from contact with the light guide to respectively introduce and remove attenuated total reflection induced losses in the light guide to respectively prohibit and permit the passage of light through the light guide.

18. An optical switch comprising: a light guide formed by a strip of polymer film, and means including a prism for selectively coacting and not coacting with the surface of the light guide to respectively introduce and remove frustrated total internal relfective losses in the light guide to respectively prohibit and permit the passage of light through the light guide.

19. An optical lock comprising: a light guiding strip of plastic film having a transverse slot cut through the strip, and a key having one or more transparent perforations for insertion through the slot to alter a characteristic of the light transmitted through the light guiding strip.

20. An integral optical system comprising a polymer film having a relatively narrow light guide portion and a relatively wide display portion connected to one end of the light guide portion by a tapered section where the display protion has indicia etched or embossed on the surface, and means for introducing light into the other end of the light guide portion such that the light passes through the tapered portion to the display portion where it is scattered to provide a visual image of the indicia.

21. The integral optical system of claim 20 in which the means for introducing light includes an optical sensor so as to provide an integral sensor-display system.

22. An integral optical coupling comprising a polymer film having a linear portion and a non-linear portion formed by folding a transition section of substantially greater width than the linear portion.

23. The integral optical coupling of claim 22 in which the non-linear portion is circular and is formed by folding a tapered transition section.

24. A method of fabricating an integral planar polymer light guide network comprising the steps of:
providing a sheet of planar polymer material,
cutting the sheet to form a light guide bus strip and one or more light guide branch strips integrally connected to the light guide bus strip thereby eliminating the need for individual couplers between the bus strip and each branch strip, and
annealing the polymer network after cutting to remove stresses and strains.

25. An integral light guide network comprising a polymer film which has been cut to form a bus strip and one or more branch strips integrally connected to the bus strip thereby eliminating the need for individual couplers between the bus strip and each branch strip and easing alignment and interface problems otherwise associated with fiber optic networks, the polymer film having an index of refraction within a range from about 1.4 to about 1.6.

26. An integral light guide network comprising a polymer film which has been cut to form a bus strip and one or more branch strips integrally connected to the bus strip thereby eliminating the need for individual couplers between the bus strip and each branch strip and easing alignment and interface problems otherwise associated with fiber optic networks, the polymer film having a light transmission loss characteristic greater than about 140 dB/km.

27. An integral light guide network comprising a polymer film which has been cut to form a bus strip and one or more branch strips integrally connected to the bus strip thereby eliminating the need for individual couplers between the bus strip and each branch strip and easing alignment and interface problems otherwise associated with fiber optic networks, the polymer film being one from the group consisting of polycarbonate, polymethylmetacrylate and polystyrene.

28. An integral light guide network comprising a polymer film which has been cut to form a bus strip and one or more branch strips integrally connected to the bus strip thereby eliminating the need for individual couplers between the bus strip and each branch strip and easing alignment and interface problems otherwise associated with fiber optic networks, the branch strips being up to about 3 millimeters in width.

29. An integral light guide network comprising a polymer film which has been cut to form a bus strip and one or more branch strips integrally connected to the bus strip thereby eliminating the need for individual couplers between the bus strip and each branch strip and easing alignment and interface problems otherwise associated with fiber optic networks, the polymer film being covered by a layer of cladding having an index of refraction lower than the index of refraction of the polymer film.

30. An integral light guide network comprising a polymer film which has been cut to form a bus strip and at least two branch strips of different widths integrally connected to the bus strip thereby eliminating the need for individual couplers between the bus strip and each branch strip and easing alignment and interface problems otherwise associated with fiber optic network.

31. An integral light guide network comprising a polymer film which has been cut to form a bus strip and one or more branch strips integrally connected to the bus strip thereby eliminating the need for individual couplers between the bus strip and each branch strip and easing alignment and interface problems otherwise associated with fiber optic networks, at least one branch strip being tapered in width.

32. An integral light guide network comprising a planar plastic film up to about 500 microns in thickness which has been cut to form a plurality of integrally connected light guiding strips thereby eliminating the need for individual couplers and enabling the use of low cost manufacturing techniques and easing alignment and interface problems otherwise associated with fiber optic networks, at least one of the light guiding strips including an optical filter means for passing light of certain wavelengths and blocking light of other wavelengths to provide a wavelength selective light guiding strip.

33. An integral light guide network comprising a planar plastic film up to about 500 microns in thickness which has been cut to form a plurality of integrally connected light guiding strips thereby eliminating the need for individual couplers and enabling the use of low cost manufacturing techniques and easing alignment and interface problems otherwise associated with fiber optic networks, the optical filter means including a light absorbing dye coated on a surface area of the light guiding strip.

34. An integral light guide network comprising a planar plactic film up to about 500 microns in thickness which has been cut to form a plurality of integrally connected light guiding strips thereby elminating the need for individual couplers and enabling the use of low cost manufacturing techniques and easing alignment and interface problems otherwise associated with fiber optic networks, the plurality of light guiding strips each including an optical filter means where the respective optical filter means have different wavelength passbands to provide a plurality of different wavelength selective light guiding strips.

35. An integral light guide network comprising a planar plastic film up to about 500 microns in thickness which has been cut to form a plurality of integrally connected light guiding strips thereby eliminating the need for individual couplers and enabling the use of low cost manufacturing techniques and easing alignment and interface problems otherwise associated with fiber optic networks, the plurality of light guiding strips each including an optical filter means and an optical switch means where the respective optical filter means have nonoverlapping wavelength passbands thereby providing a network suitable for wavelength division multiplex operation.

36. An optical liquid level sensor comprising a strip of planar plastic light guide extending down into the liquid where the light guide is straight and includes a reflector at the lower end of the guide which is immersed in the liquid, and means for passing light through the light guide such that the level of the liquid can be sensed based on the attenuation of the guided light due to radiative losses at the interface of the liquid and the guide.

37. An optical liquid level sensor comprising a strip of planar plastic light guide extending down into the liquid where the width of the strip in contact with the liquid is varied to adjust the radiation loss per unit length so as to control the sensitivity and linearity of the sensor, and means for passing light through the light guide such that the level of the liquid can be sensed based on the attenuation of the guided light due to radiative losses at the interface of the liquid and the guide.

38. An optical liquid level sensor comprising a strip of planar plastic light guide extending down into the liquid where the light guide has serrated teeth along a tapered edge from which light is internally reflected into the guide when the teeth are out of the liquid and from which light is transmitted out of the guide when the teeth are immersed in the liquid, and means for passing light through the light guide such that the level of the liquid can be sensed based on the attenuation of the guided light due to losses at the interface of liquid and the guide.

* * * * *